United States Patent
Weissinger

(10) Patent No.: US 7,484,314 B2
(45) Date of Patent: Feb. 3, 2009

(54) MICROMETER SCREW GAUGE WITH NON-ROTATING MEASURING SCREW

(75) Inventor: Hansjörg Weissinger, Aichwald (DE)

(73) Assignee: Carl Mahr Holding GmbH, Göttingen (DE)

( * ) Notice: Subject to any disclaimer, the term of this patent is extended or adjusted under 35 U.S.C. 154(b) by 0 days.

(21) Appl. No.: 11/728,971

(22) Filed: Mar. 27, 2007

(65) Prior Publication Data

US 2007/0214675 A1    Sep. 20, 2007

Related U.S. Application Data

(63) Continuation-in-part of application No. PCT/EP2005/010345, filed on Sep. 23, 2005.

(30) Foreign Application Priority Data

Sep. 28, 2004    (DE) ............................... 10 2004 889

(51) Int. Cl.
*G01B 3/18*    (2006.01)
(52) U.S. Cl. .......................................... 33/831; 33/813
(58) Field of Classification Search ............... 33/813, 33/814, 815, 816, 817, 818, 819, 820, 821, 33/822, 825, 826, 828, 829, 831
See application file for complete search history.

(56) References Cited

U.S. PATENT DOCUMENTS

| | | | |
|---|---|---|---|
| 455,644 A * | 7/1891 | Sloane | 33/813 |
| 1,638,366 A | 8/1927 | Sandoz | |
| 2,690,016 A * | 9/1954 | Seaholm | 33/814 |
| 3,166,850 A | 1/1965 | Yamazawa | |
| 3,727,318 A * | 4/1973 | Meier | 33/814 |
| 3,758,956 A * | 9/1973 | Nakata | 33/816 |
| 4,553,330 A * | 11/1985 | Yamauchi et al. | 33/815 |

FOREIGN PATENT DOCUMENTS

EP            44823 A2 * 1/1982
EP       1 324 000 A1    2/2003

* cited by examiner

*Primary Examiner*—R. A. Smith
(74) *Attorney, Agent, or Firm*—R. S. Lombard; K. Bach

(57) ABSTRACT

A micrometer screw gauge comprises a divided measuring spindle. The gauge's front part representing the measuring screw is secured in a torque-proof manner in a guide element. The rear section configured as a threaded spindle has the same diameter. In so doing, it is coupled in an axially rigid but rotatable manner to the measuring screw. This measuring spindle may replace a conventional, rigid, continuous measuring spindle of a micrometer screw gauge and, in so doing, results, without substantial design change, in a micrometer screw gauge comprising a non-rotatable measuring spindle.

19 Claims, 4 Drawing Sheets

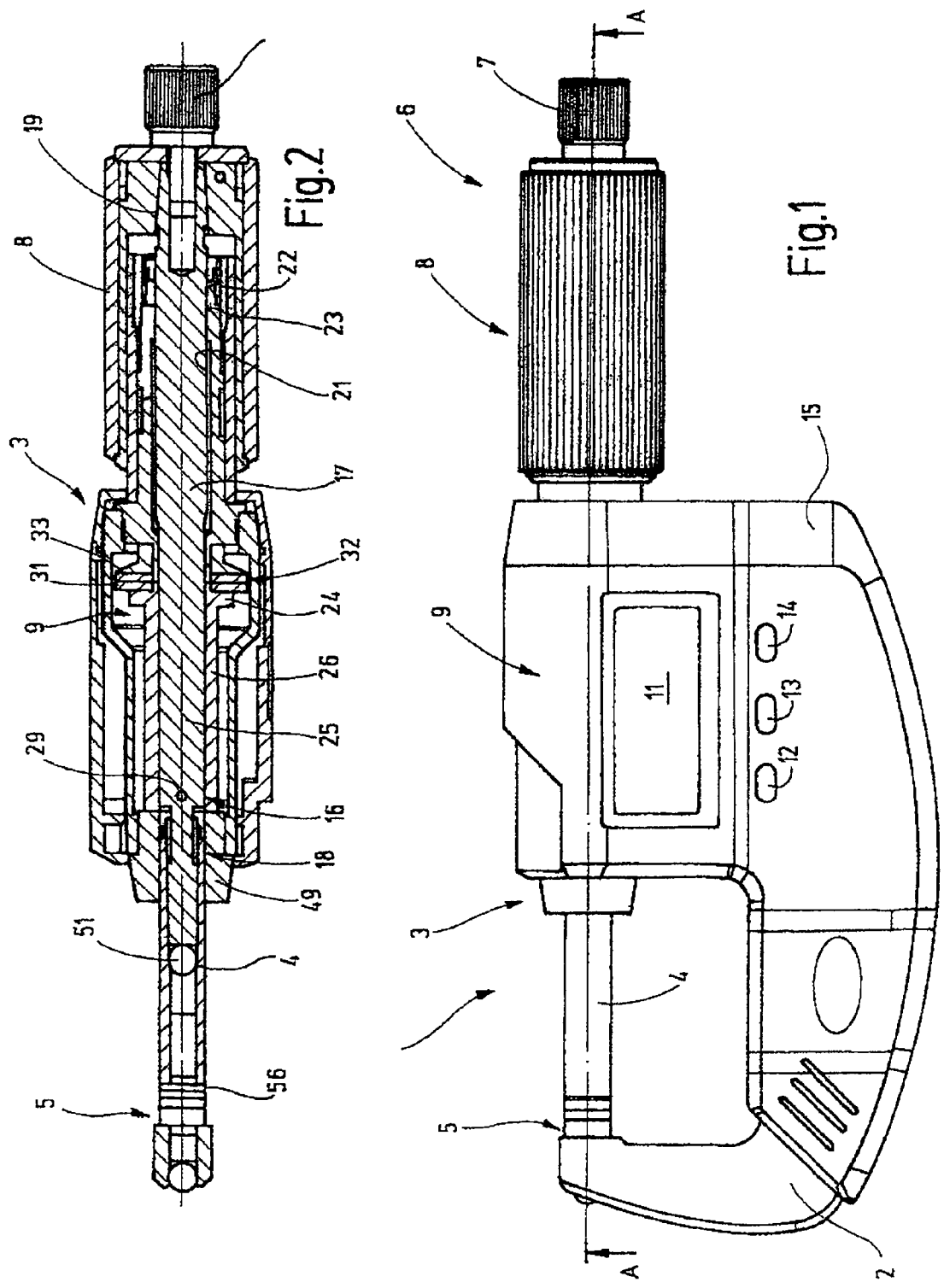

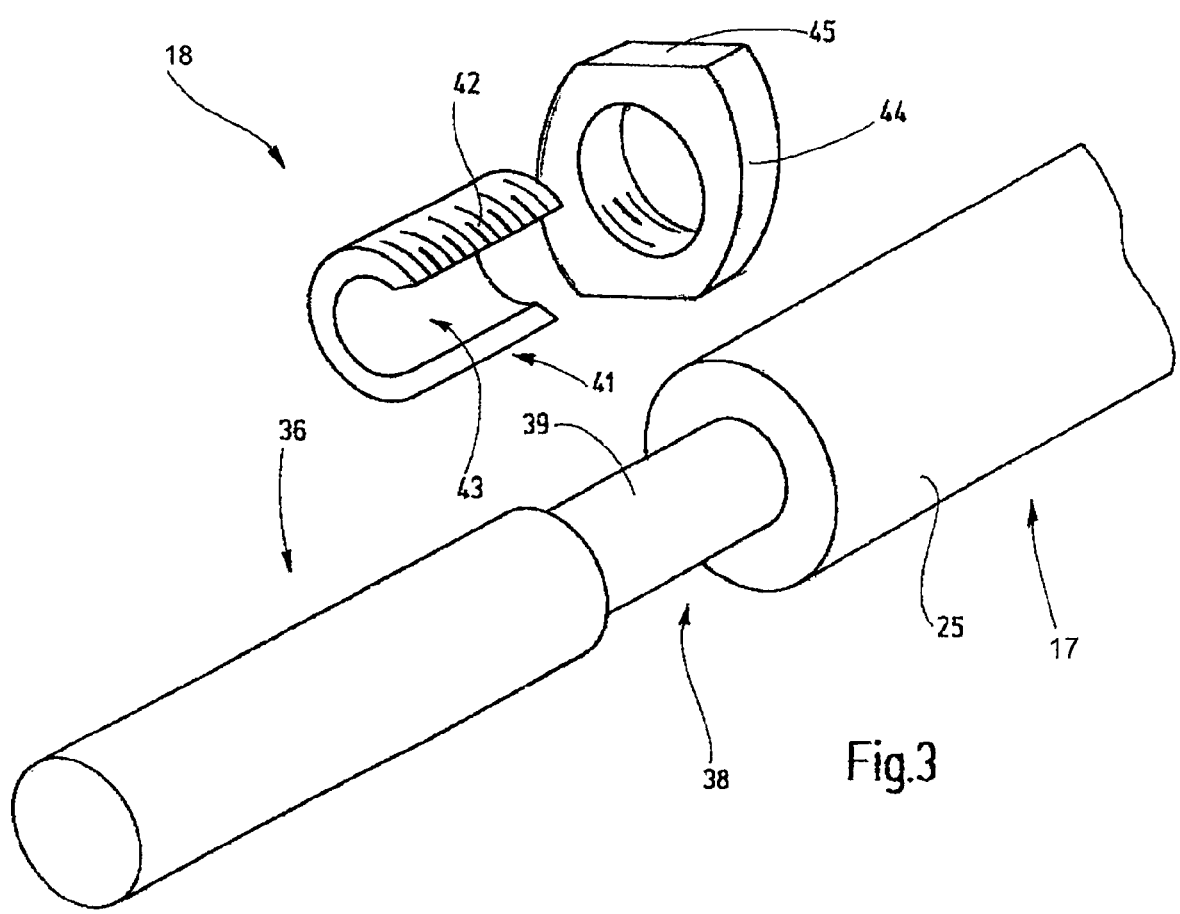

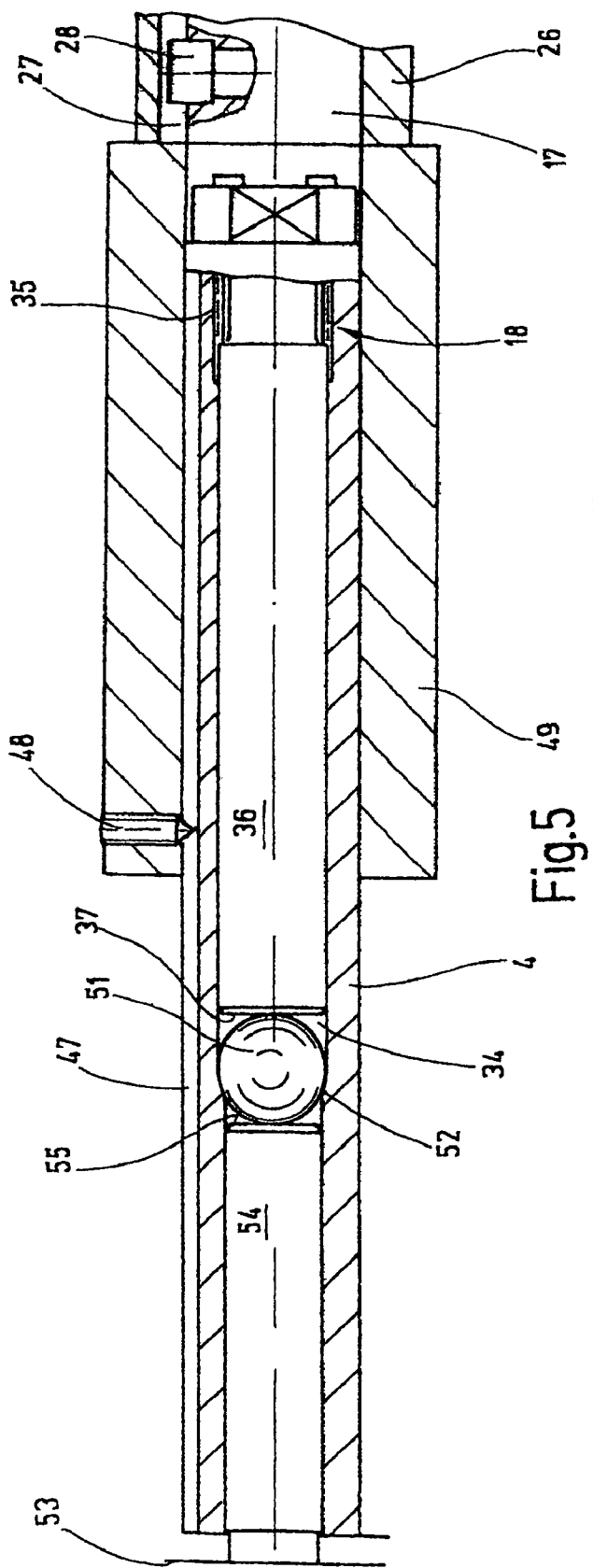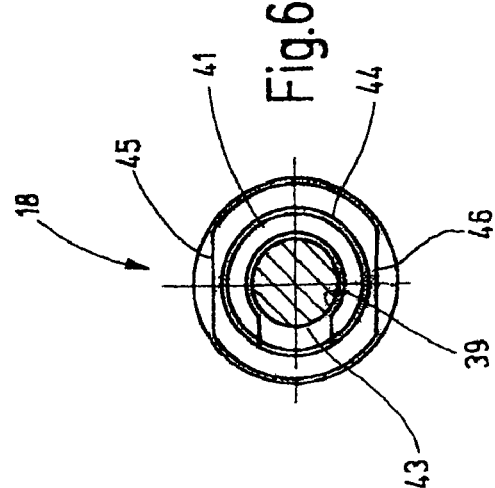

MICROMETER SCREW GAUGE WITH NON-ROTATING MEASURING SCREW

CROSS-REFERENCE TO RELATED APPLICATION

This is a continuation-in-part application of international application PCT/EP2005/010345 filed Sep. 23, 2005 and claiming the priority of German Application 10 2004 046 889.3 filed Sep. 28, 2004.

BACKGROUND OF THE INVENTION

The invention relates to a micrometer screw gauge which is designed or used for setting or measuring longitudinal dimensions.

Micrometer screw gauges are used, for example, as external micrometers for the accurate measurement of diameters or other one-dimensional dimensions, and for the measurement of the size of the screw thread and the like. To do so, the external micrometers comprise two measuring screws defining between them a distance, at least one of said measuring screws being supported in a movable manner. An inertia drive can be used to change the distance between the two measuring screws, while a distance change is registered by a measuring system.

As a rule, the faces of the micrometer screws are cut to fit flat or are provided with a device for holding and tensioning gauge slides. These gauge slides, for example, comprise balls, blades or other specially configured surfaces for measuring specific workpiece profiles. For example, for screw thread measurement, blade-like gauge slides are known, whereby these slides need to be adapted to the specific screw thread. They are used for measurements between convolutions and rest against the flanks of the screw thread.

In this instance, the measurement is inconvenient when the measuring screw turns during its axial adjustment. Furthermore, a rotation of the measuring screw may result in the wear of the face of the measuring screw, in particular, if said face is brought into contact with abrasive material. For example, if abrasive materials are measured, this results in an undesirable wear when rotating measuring screws are used. Even the most minimal damage to a surface can result in measuring errors. Also, a rotating measuring screw can be inconvenient when sensitive materials or surfaces are measured or tested. For example, any sharp edges of a measuring screw can leave marks on brushed or otherwise visually appealing surfaces, or can damage sensitive surfaces, for example, varnished surfaces, soft surfaces or the like, with small cuts. This, too, is unacceptable.

SUMMARY OF THE INVENTION

The present invention provides a micrometer screw gauge comprising a divided measuring spindle. The gauge's front part representing the measuring screw is secured in a torque-proof manner in a guide element. The rear section configured as a threaded spindle has the same diameter. In so doing, it is coupled in an axially rigid, but rotatable manner to the measuring screw. This measuring spindle may replace a conventional, rigid, continuous measuring spindle of a micrometer screw gauge and, in so doing, results, without substantial design change in a micrometer screw gauge comprising a non-rotatable measuring spindle.

Considering this, there is the desire for a micrometer screw gauge comprising a non-rotating measuring screw. Existing micrometer screw gauges that are part of a manufacturing program and comprise a non-rotating measuring screw determines the external diameter of the measuring screw. In the manufacture of micrometer screw gauges of different types, that is, for example, those having a rotating measuring screw and those having a non-rotating measuring screw, the greatest number of identical parts is desirable. Therefore, the object has been to find a micrometer screw gauge with a non-rotating measuring screw, whereby this micrometer gauge can be integrated in otherwise conventional micrometer screw gauge systems with a rotating measuring screw.

This object is attained with the micrometer screw gauge in accordance with claim 1 and claim 2, for example.

The micrometer screw gauge of the present invention comprises a measuring spindle that is divided into a measuring screw, which is held in a non-rotatable manner but is supported in an axially shiftable manner, and a threaded spindle, these being arranged in axial succession and connected with each other by means of a coupling device. The coupling device permits a relative rotation of the threaded spindle against the measuring screw, whereby, however, this relative movement firmly couples the measuring screw to the threaded spindle in axial direction. The measuring screw and the threaded spindle have the same external diameter, so that the total arrangement can replace a conventional, continuously configured and rotating measuring spindle. The only change to be made to the otherwise conventional design of the micrometer screw gauge is that an anti-twist protection must be provided for the axially shiftable measuring screw. This anti-twist protection, for example, may be a first screw arranged radially with respect to the measuring screw. The first screw having a tip extending into an axial groove provided in the measuring screw. The drive of the measuring spindle, as well as the measuring system assigned to the measuring spindle, however, may remain totally unchanged. Even the base body of the external micrometer may potentially remain unchanged, with the exception of the receiving bore for the anti-twist protection. Basically, it is also possible to use the same base body when its receiving bore remains unused, that is, in case of non-use with the rotating measuring spindle, or when said bore is plugged with a filler plug.

Referring to a preferred embodiment of the invention, the coupling device of the measuring screw is provided with an axial threaded bore and the threaded spindle is provided with an annular groove, whereby the corresponding part of the threaded spindle has a diameter that is small enough for the associate part to fit into said threaded bore. A threaded bushing is seated in the annular groove; said threaded bushing being screwed into the threaded bore, thus securing the measuring screw against the threaded spindle. Alternatively, referring to a less preferred embodiment, the arrangement may also be in reverse, that is, the threaded bore is provided in the threaded spindle, whereas the extension having the annular groove is provided on the measuring screw.

The threaded bushing may be mounted to the annular groove at a later time. Referring to a first embodiment, the threaded bushing is designed in one piece and has a lateral slit so that it may be slipped over the cylindrical section of the measuring screw or the measuring spindle, said section representing the bottom of said annular groove. In so doing, the width of the slit may approximately correspond to, or be somewhat smaller than, the diameter of the cylindrical section, so that the threaded bushing comes into locking engagement with the annular groove. However, the threaded bushing is then seated in said annular groove with ample radial and, preferably, also with axial play. The threaded bushing may consist of metal or of plastic material. Alternatively, the threaded bushing, of metal or plastic material, may consist of two matching shell-like halves that fit together along longitudinally extending joints. Together, these halves of the longitudinally divided threaded bushing can be placed into the annular groove and then be screwed into the threaded bore of the measuring screw or the measuring spindle. The halves may be manufactured separately or they may be parts of a one-piece threaded bushing, said parts being separated from each other, for example, along pre-specified rupture lines. These rupture lines are determined, for example, by nominal rupture points, that is, pre-fabricated weak points, and thus, due to their roughness ensure an unambiguous positioning of the threaded bushing halves relative to each other.

Also, alternatively, the threaded bushing may consist of a flat element having a profile. The flat element being bent around the bottom of the annular groove. Also, alternatively, it is possible to fabricate the threaded bushing of a resilient material, for example, resilient plastic material, in which case the threaded bushing is again made in one piece and has a lateral slit. The slit may be significantly narrower than the diameter of the groove bottom. It is also possible to configure the spring action such that the slit is reduced to a longitudinally extending parting line, at which the opposing slit faces of the threaded bushing abut against each other.

Seated on the threaded bushing is preferably a counter-nut that is tightened against the face of the threaded screw which is provided with the threaded bore. Considering the reverse arrangement, in which the threaded bore is seated in the measuring spindle, the counter-nut is tightened against the measuring spindle. By appropriate adjustment of the position of the threaded bushing in the threaded bore and by fixing this position by tightening the counter-nut, it is possible to achieve a tight abutment of the measuring screw against the threaded spindle, said abutment being almost completely free of any play. In so doing, the threaded spindle remains freely rotatable with respect to the measuring screw.

The measuring screw is preferably provided with an axial bore, in which the described thread for the threaded bushing is provided. The bore, in turn, is preferably configured as a through bore. Thus, said bore preferably terminates on the free face of the measuring screw and can receive shafts of different gauge slides in that region. The accuracy of the micrometer screw gauge is particularly aided if the gauge slide is in direct or indirect contact with an extension of the measuring spindle. This contact can be achieved, for example, in that the threaded spindle's affected extension that extends into the through bore has a corresponding face-side reference surface, which may act as a stop for a shaft of a gauge slide. Referring to a more sophisticated embodiment, however, no direct contact is achieved between the potentially plane end faces of the shaft of the gauge slide and the extension of the measuring spindle, but an indirect contact is created by way of an intermediate body, for example, as a ball. This ball may be pushed into the through bore and, on the one hand, form an abutment for the face of the extension of the threaded spindle, and, on the other hand, for the face of the shaft of the gauge slide. In order to unambiguously define the position of the ball in the through bore, it is advantageous to support said bore against an annular shoulder or to firmly secure it otherwise in axial direction. Preferably, the stepped bore has a wider diameter toward the threaded bore and a smaller diameter toward the gauge slide. In so doing, the face of the extension of the threaded spindle is supported on the firmly pushed in ball that is additionally secured in axial direction by the annular shoulder, which, in turn, benefits the no-play fixation of the threaded spindle on the measuring screw.

BRIEF DESCRIPTION OF THE DRAWINGS

Additional details of advantageous embodiments of the invention are obvious from the drawings, from the related description or from the claims. The drawings show an exemplary embodiment in accordance with the invention, in which:

FIG. 1 is a side-elevational view of an external micrometer comprising a micrometer screw gauge in accordance with the present invention;

FIG. 2 is a cross-sectional view of the external micrometer in accordance with FIG. 1, along the intersection line A-A in FIG. 1;

FIG. 3 is a perspective exploded view of a threaded bolt, which is part of a measuring screw, with a coupling device;

FIG. 5 is a longitudinal sectional view of the measuring spindle; and,

FIG. 6 is a cross-section of the measuring spindle in the region of said spindle's coupling device.

DESCRIPTION OF THE PREFERRED EMBODIMENTS

Figure 4:
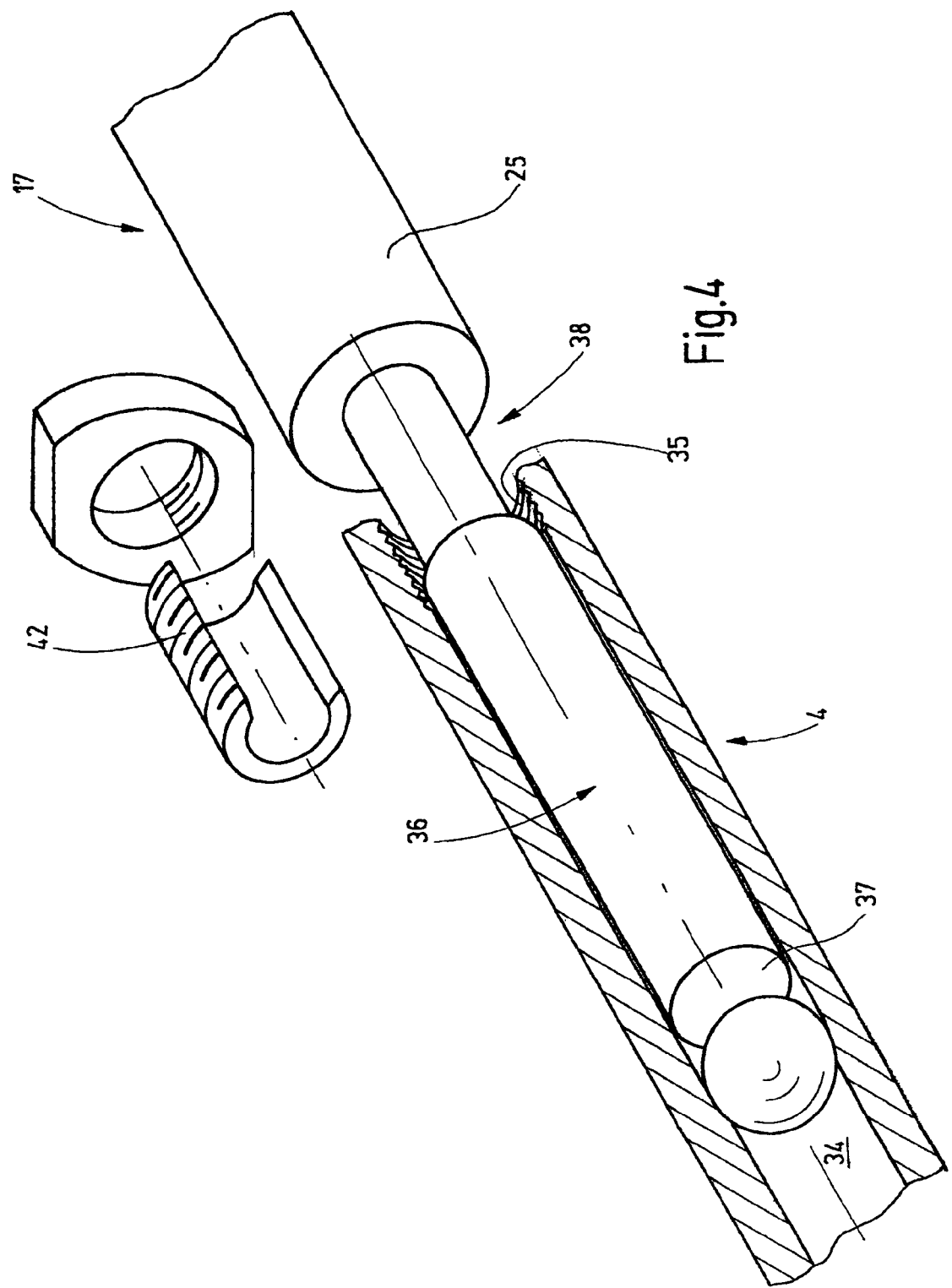
FIG. 4 is an exploded view, partially in section, of the measuring spindle with threaded spindle and measuring screw and coupling device.

FIG. 1 shows an external micrometer 1, which comprises a bracket-shaped base body 2, a micrometer screw gauge 3 with a measuring screw 4 and, in alignment with and opposed thereto, a counter-measuring screw 5. The counter-measuring screw 5 and the measuring screw 4 are held on opposing legs of the base body 2, said legs defining between them a mouth-like opening. Whereas the counter-measuring screw 5 is rigidly affixed to the base body 2, the measuring screw 4 can be adjusted with respect to its longitudinal direction. An inertia drive that is being actuated via a means 6 is used for adjustment. Typically, the means 6 includes a small-diameter cylindrical knurled handle 7 and a large-diameter, likewise cylindrical, knurled handle 8. Corresponding to the rotation of the handle 7 or 8, the measuring screw 4 is moved away from the counter-measuring screw 5 or toward said counter-measuring screw. The handle 8 acts on the inertia drive via a force-limiting device, such as, for example, a suitable ratchet.

In addition, the base body 2 holds a measuring device 9 having a display 11 that is designed, for example, as a liquid crystal display, LCD, and is used to indicate the axial shift of the measuring screw 4 in a digital and highly accurate manner. The control elements 12, 13, 14, as well as the measuring device 9, are arranged on a housing 15 held on the base body 2 and are used for zeroing and for switching between different units of length.

As illustrated by FIG. 2, the micrometer screw gauge 3 contains a measuring spindle 16, which includes the measuring screw 4, as well as a threaded spindle 17. These are connected among each other by a coupling device 18 that will be explained in greater detail at a later point. The threaded spindle 17 is rotatably supported in the micrometer screw gauge 3 and can be axially shifted therein. The spindle 17 has a cylindrical basic shape and is provided on its rear end with a conical extension 19, to which the handles 7, 8 are attached. In addition, it has on its end adjoining the extension 19 an exterior thread 21 that is in engagement with an interior thread, which is provided on a tubular extension 23 that is stationary with respect to the base body 2, Accordingly, the threaded spindle 17 moves, as it is being turned, into the extension 23 in longitudinal direction.

For recording the axial shift of the threaded spindle 17, the measuring device 9 is provided. The device 9 being associated with a bushing 26 that is provided with a flange 24 and is seated on a smooth cylindrical section 25 of the threaded spindle 17. As is obvious from FIG. 5, this bushing 26 has a longitudinally extending groove 27, which is provided on said bushing's interior side and in which a head 28 of a screw acting as the slide block is radially screwed into a threaded bore 29 (FIG. 2) of the threaded spindle 17. In so doing, the bushing 26 is connected to the threaded spindle 17 in a torque-proof manner. One half 31 of an angle transmitter 32 is held on the flange 24, said half 31 being located directly opposite a second half 33 belonging to the angle transmitter 32, said half 33 being arranged in a stationary manner. The twisting of the halves 31, 33 relative to each other is detected by an electronic monitoring and analyzing circuit and converted into longitudinal dimension values that are indicated on the display 11.

As is obvious from FIGS. 4 and 5, the measuring screw 4 has a preferably tubular configuration. This measuring screw has a cylindrical exterior form and is provided with a bore 34 that is preferably configured as a stepped through bore. An interior thread 35 is provided on the side of the bore 34 that faces the threaded spindle 17, said bore 34 being used to connect the measuring screw 4 to the threaded spindle 17 and, as a result, is a part of the coupling device 18. The interior thread 35 is particularly obvious in FIG. 4.

With reference to FIGS. 3 and 4, the threaded spindle 17 has an extension 36 which extends coaxially from said spindle into the bore 34 and is seated therein with play. The extension 36 has a flat face 37 and its cylindrical generated surface is seated with play in the bore 34. The diameter of the extension 36 is clearly smaller than that of the section 25 of the threaded spindle 17. Directly adjoining the section 25, that is, at the beginning of the extension 36, as it were, a wide annular groove 38 having preferably a cylindrical bottom 39 is provided. This annular groove 38 is used to secure the threaded bushing 41, which is also part of the coupling device 18. The threaded bushing 41 has an exterior thread 42 that fits the interior thread 35, so that the measuring screw 4 can be screwed onto the threaded bushing 41 when said bushing is seated in the annular groove 38.

The threaded bushing 41 has an interior diameter which is slightly greater than the diameter of the bottom 39. In addition, the threaded bushing 41 is slightly shorter than the axial extension of the annular groove 38, that is, than the distance between the annular lateral flanks of the annular groove 38. The threaded bushing 41 has a lateral slit 43, which is large enough to allow the lateral placement of the threaded bushing 41 in the annular groove 38. FIG. 6 illustrates this. Consequently, the width of the slit 43 corresponds to the diameter of the bottom 39. In the preferred case, the slit width is slightly less than the diameter of the bottom 39, so that the threaded bushing 41 can come into locking engagement in the annular groove 38 when placed therein. If the engagement effect is to be avoided, the slit 43 may also be made wider.

The coupling device 18 optimally comprises, in addition, a counter-nut 44, which fits the threaded bushing 41. The counter-nut 44 has an exterior diameter that is smaller than that of the section 25. One or more facets 45, 46 on the exterior circumference of the counter-nut 44 permit the attachment of a tool in order to be able to tighten the counter-nut 44 against the face of the measuring screw 4.

Referring to FIG. 5, on its exterior side, the measuring screw 4 has a longitudinally extending groove 47, into which extends the tip of a screw 48. This screw acts as the anti-twist protection, so that the measuring screw 4 can be shifted in longitudinal direction, however is non-rotatably seated in the base body 2 or in a corresponding guide body 49, as is shown by FIG. 2.

As is obvious from FIG. 5, a ball 51 is located in the bore 34, against which abuts the face 37 of the extension 36 on one side, and which, in turn, rests on a step 52 where the bore 34 reduces its diameter. The ball 51 is pushed into the bore 34.

The measuring screw 4 is associated with a gauge slide 53 which has a cylindrical shaft 54. With minimal play, the cylindrical shaft 54 fits into the bore 34. This cylindrical shaft 54 has a preferably flat face 55 that abuts against the ball 51. The ball 51 thus conveys the precise axial position between the gauge slide 53 and the threaded spindle 17. To do so, the gauge slide 53 is not in abutment with the face of the measuring screw 4.

Referring to the embodiment of the external micrometer 1 as shown in FIG. 2, this is a micrometer screw gauge 3 with a flat closed measuring screw 4 and a counter-measuring screw 5. The corresponding gauge slide 56, which has been inserted in the measuring screw 4, abuts against the face of the measuring screw 4. Its shaft is not in contact with the ball 51.

The measuring spindle 16 is mounted as follows:

First, the threaded spindle 17 is provided with the threaded bushing 41 in that said bushing is placed into the annular groove 38. Then the threaded bushing 41 is held in a torque-proof manner, and the counter-nut 44 is screwed on. Then the measuring screw 4 is screwed on the threaded bushing 41 until the threaded spindle 17 is held on the measuring screw 4 with minimal play. This spindle 17 is then seated with minimal play between the threaded bushing 41 and the ball 51. In this state, the counter-nut 44 is tightened. Thus, the measuring spindle 16 having an exterior overall cylindrical configuration and having a constant diameter is obtained, whereby its front torque-proof part consists of the measuring screw 4 and its rear rotatable part consists of the threaded spindle 17. When in operation, the measuring screw 4 is non-rotatably secured by the screw 48, which, in so doing, forms an anti-twist protection with the groove 47. The measuring device 9, as well as the screw drive, is configured as in a micrometer screw gauge having a rotating measuring spindle. The measuring spindle 16, which has been divided in accordance with the invention, can be replaced by a continuous rigid measuring spindle, if necessary. In this instance, only the screw 48 is removed in order to retrofit the micrometer screw gauge 3 to a micrometer screw gauge having a rotating spindle.

The micrometer screw gauge 3 of the present invention comprises a divided measuring spindle 16. Said gauge's front part representing the measuring screw 4 is secured in a torque-proof manner in a guide element. The rear section configured as a threaded spindle 17 has the same diameter. In so doing, it is coupled in an axially rigid but rotatable manner to the measuring screw 4. This measuring spindle 16 may replace a conventional, rigid, continuous measuring spindle of a micrometer screw gauge and, in so doing, results, without substantial design change in a micrometer screw gauge comprising a non-rotatable measuring spindle.

What is claimed is:

1. A micrometer screw gauge (3) comprising a measuring spindle (16) divided into a non-rotatable, axially shiftable supported measuring screw (4) and a threaded spindle (17) that is rotatably connected to the measuring screw (4) via a coupling device (18), the coupling device (18) includes one of the threaded spindle (17) or the measuring screw (4) provided with an axial bore (34) having an interior thread (35) proximate the bore (34) while the other of the measuring screw (4)

or the threaded spindle (17) without the axial bore (34) is provided with an annular groove (38), a threaded bushing (41) is seated in groove (38), the threaded bushing (41) having a lateral slit (43), said bushing (41) being screwably attached proximate the thread (35).

2. The micrometer screw gauge (3) in accordance with claim 1, wherein the measuring screw (4) and the threaded spindle (17) have the same outside diameter and are arranged in axial alignment with respect to each other and adjoining each other in the longitudinal direction.

3. The micrometer screw gauge (3) in accordance with claim 2, wherein the measuring screw (4) has the axial bore (34).

4. The micrometer screw gauge (3) in accordance with claim 3, wherein the bore (34) of the measuring screw (4) has a through bore with a step (52).

5. The micrometer screw gauge (3) in accordance with claim 4, further comprising a ball (51), the ball (51) is seated in the bore (34) of the measuring screw (4) and is supported by the step (52).

6. The micrometer screw gauge (3) in accordance with claim 5, further comprising exchangeable gauge slides (53) in association with the measuring screw (4), the ball (51) forms a reference surface for the exchangeable gauge slides (53).

7. The micrometer screw gauge (3) in accordance with claim 5, wherein in the threaded spindle (17) includes an axial extension (36) which extends into the bore (34), of measuring screw (4).

8. The micrometer screw gauge (3) in accordance with claim 7, wherein the extension (36) abuts against the ball (51).

9. The micrometer screw gauge (3) in accordance with claim 7, wherein the extension (36) has the annular groove (38) provided thereon.

10. The micrometer screw gauge (3) in accordance with claim 3, wherein the interior thread (35) of the measuring screw (4) is provided proximate the end of said bore (34) facing the threaded spindle (17).

11. The micrometer screw gauge (3) in accordance with claim 2, wherein the slit (43) of the threaded bushing (41) has a width which permits the lateral placement of the threaded bushing (41) in the annular groove (38).

12. The micrometer screw gauge (3) in accordance with claim 11, wherein the slit (43) of the threaded bushing (41), has a width measured in the circumferential direction which is the same as the inside diameter of the annular groove (38) of the threaded spindle 17.

13. The micrometer screw gauge (3) in accordance with claim 11, wherein the slit (43) of threaded bushing (41), has a width measured in the circumferential direction which is slightly less than the inside diameter of the annular groove (38) of the threaded spindle (17), thereby permitting a locking engagement of the threaded bushing (41) in the annular groove (38), with the spindle (17).

14. The micrometer screw gauge (3) in accordance with claim 2, wherein the threaded bushing (41) is divided in the longitudinal direction.

15. The micrometer screw gauge (3) in accordance with claim 2, wherein a counter-nut (44) is provided on the threaded bushing (41).

16. The micrometer screw gauge (3) in accordance with claim 1, wherein the threaded spindle (17) is in engagement with a threaded bore (29) held in an axially non-shiftable manner with respect to a frame (22).

17. The micrometer screw gauge (3) in accordance with claim 1, wherein the threaded spindle (17) is connected to a measuring device (9) used for the detection of the revolutions of the threaded spindle (17).

18. A micrometer screw gauge (3) modular system comprising, a removable first measuring spindle (16) including a measuring screw (4) which is non-rotatably supported, and an adjoining threaded spindle (17) which is rotatably connected to the measuring screw (4) via a coupling device (18), the coupling device (18) includes one of the threaded spindle (17) or the measuring screw (4) provided with an axial bore (34) having an interior thread (35) proximate the bore (34), while the other of the measuring screw (4) or the threaded spindle (17) without the axial bore (34) provided with an annular groove (38), in which is seated a threaded bushing (41) having a lateral slit (43), said bushing (41) being screwed into the thread (35); a removable second measuring spindle including a measuring screw (4) and a threaded spindle (17), said measuring screw (4) and threaded spindle (17) are rigidly connected to each other; and, a base body (2) on which is arranged a measuring system for the detection of a rotation of a measuring spindle, and which has a through bore to selectively receive one of said first and second measuring spindles.

19. The micrometer screw gauge (3) modular system in accordance with claim 18, wherein the measuring screw (4), which is non-rotatably supported, and the threaded spindle (17) have the same outside diameter and are arranged in axial alignment with respect to each other and adjoining each other in the longitudinal direction.

\* \* \* \* \*